March 5, 1968 M. ADEN ET AL 3,371,764
POWER ROLL COUPLING CAM
Filed Oct. 3, 1966
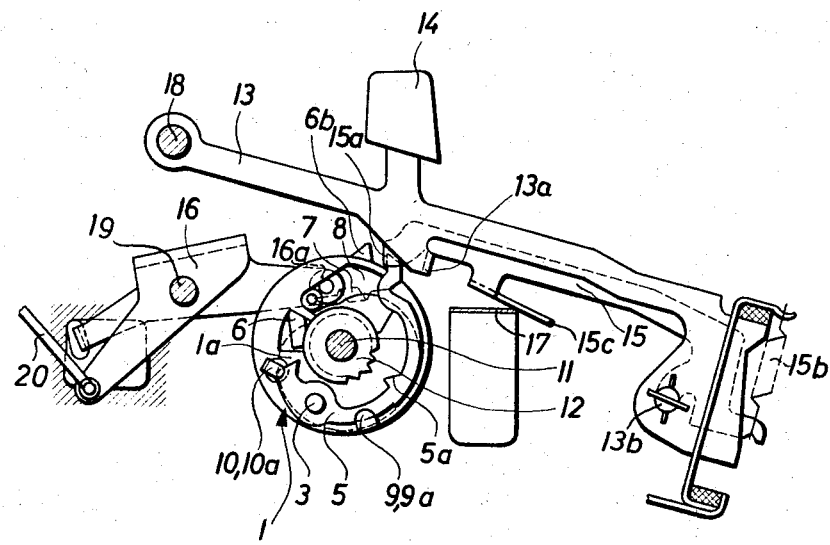
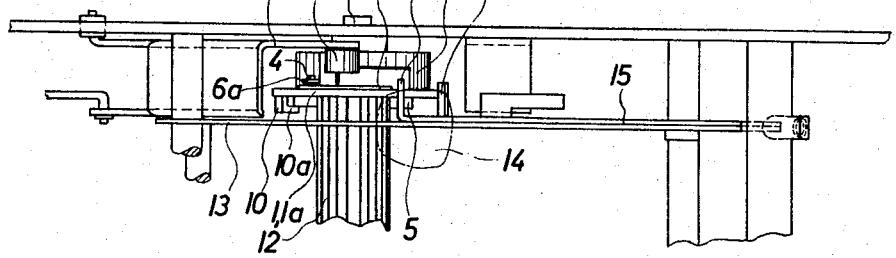
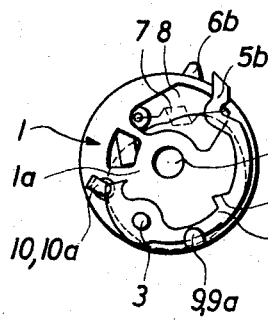
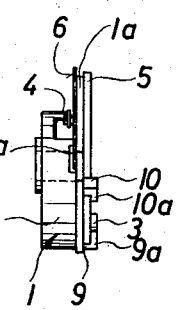
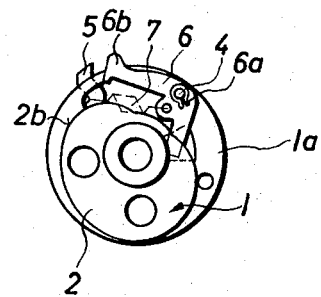
INVENTORS
Manfred Aden
Kurt Chvatlinsky
Michael J Striker
ATTORNEY

United States Patent Office 3,371,764
Patented Mar. 5, 1968

3,371,764
POWER ROLL COUPLING CAM
Manfred Aden, Sande, and Kurt Chvatlinsky, Wilhelmshaven, Germany, assignors to Olympia Werke A.G., Wilhelmshaven, Germany
Filed Oct. 3, 1966, Ser. No. 583,705
Claims priority, application Germany, Oct. 2, 1965, O 8,420
8 Claims. (Cl. 197—17)

ABSTRACT OF THE DISCLOSURE

A coupling for connecting the toothed power roll of a typewriter with a movable element for actuating the same as an integral body consisting of a synthetic plastic material and having on one side a cam portion for operating a movable element of the typewriter, and on both sides integral journals for pivotally supporting coupling means cooperating with the teeth of the power roll so that noise produced by the impact of the teeth of the power roll on the coupling means is produced by the plastic synthetic material of the integral body.

---

The present invention relates to a power roll coupling for a typewriter, and more particularly to a coupling which is particularly suited for coupling the power drive roll of an electric typewriter with a movable element of the typewriter, for example, with the back spacing member or with the shifting member by which the type bar segment is moved between the lower and the upper case positions.

Couplings according to the prior art serving this purpose consist of several metal discs and a metal cam secured to each other. Metal journals are secured by thread or by rivets to the metal discs and carry coupling means such as a coupling member cooperating with the power drive roll, and a locking pawl which prevents turning of the coupling in the wrong direction of rotation.

The construction of the prior art have the disadvantage that they consist of a great number of parts, which are expensive to manufacture and assemble, and produce noise during operation.

It is one object of the invention to overcome the disadvantages of the known power roll couplings, and to provide a power roll coupling which is inexpensively manufactured, is easy to assemble by unskilled labor, and perfectly operates for an extended period of time.

Another object of the invention is to provide a power roll coupling which produces less noise than known power roll couplings during operation.

Another object of the invention is to provide a power roll coupling with an integral body consisting of a synthetic plastic material dampening noise and permitting the forming of integral journals thereon.

With these objects in view, the present invention relates to a coupling for connecting the power drive roll of the typewriter or like business machine with one of the movable elements of the typewriter for actuating the same. A coupling according to a preferred embodiment of the invention includes an integral body, preferably consisting of a synthetic plastic material, and having a cam portion adapted to cooperate with the follower portion of a movable element of the typewriter for actuating the same, and a mounting portion supporting coupling means cooperating with the power roll. Since the body is integral and preferably consists of a synthetic plastic material, the transmission of motion from the power drive roll to the movable element of the typewriter produces little noise.

In the preferred embodiment of the invention, the mounting portion is a circular disc having integral journals thereon for supporting a turnable coupling member and a locking pawl for turning movement. The cam portion is located on one side of the disc and has a peripheral cam track which is at least partly inwardly spaced from the periphery of the disc. Integral angular projections on the mounting disc guide the coupling member which is supported on one of the integral journals so that the same cannot slip off the journal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary side elevation illustrating parts of a typewriter, and a power roll coupling according to the invention;

FIG. 2 is a plan view of the apparatus shown in FIG. 1;

FIG. 3 is an elevation illustrating one side of the coupling;

FIG. 4 is an elevation illustrating the other side of the coupling; and

FIG. 5 is a front view of the coupling.

Referring now to the drawing, an integral body 1 consisting of a synthetic plastic material includes a circular mounting disc 1a and a cam portion 2 laterally projecting from one side of the mounting disc 1a and being integral with the same.

Mounting disc 1a has on opposite sides thereof, integral projections 3 and 4 forming cylindrical journals for supporting coupling means. Journal 3 supports a coupling pawl 5 which has a projection 5a and an end portion 5b projecting beyond the circular periphery of mounting disc 1a. Projection 5a forms a tooth cooperating with the teeth of a power drive roll 12 which is fixed on a continuously rotating drive shaft 11. The integral body 1 has a central opening 1b through which shaft 11 passes so that the coupling is rotatably mounted on shaft 11. Journal 4 turnably supports a locking pawl 6 which has one end portion located in a slot 2a of cam portion 2, see FIG. 5, and abutting a portion of cam 2 under the action of a spring 7 which connects locking pawl 6 with the end portion 5b of coupling member 5.

Mounting disc 1a has a cutout 8 through which spring 7 passes, coupling member 5 and locking pawl 6 being located on opposite sides of the mounting disc 1a. Locking pawl 6 has an end portion 6b projecting beyond the periphery of mounting disc 1a. The resilient split ring 6a is located in an annular recess near the free end of journal 4 to retain locking pawl 6 against axial movement.

On the side of mounting disc 1a remote from cam 2, integral angular projections 9 and 10 are provided which have portions 9a and 10a extending parallel to the lateral surface of mounting disc 1a and partly over coupling member 5 so that the same is guided during its angular movement about journal 3 and retained on the same.

When the coupling is mounted on a portion of drive shaft 11 as shown in FIG. 1, the end portion 5b of coupling member 5 projects into the region of a transverse holding projection 15a on a holding lever 15, mounted on key lever 13 for angular movement and being biased by a spring 15b to turn about a pivot 13b to a position in which a projection 15c abuts an abutment 17. Key lever 13 has a key 14 and is turnable about a pivot shaft 18. Another pivot shaft 19 supports a cam follower 16 having a roller 16a located on the peripheral cam track 2b of cam portion 2. A link 20 connects cam follower 16 with the shifting means of the typebar segment or with the back spacing device, or with any other movable element of the typewriter which is to be actuated under the control of the power roll 12.

In the normal inoperative position of the apparatus, spring 7 biases coupling member 5 toward the toothed power drive roll 12, but coupling member 5 is held in the inoperative position shown in the drawing by the holding portion 15a of the holding lever 15.

When key lever 13 is turned in clockwise direction by depression of key 14, the right-hand end of holding lever 15 is lowered, and holding lever 15 turns about the abutment 17 so that holding portion 15a is raised and releases end portion 5b of coupling member 5 so that the same is moved by spring 7 to a coupling position in which its projecting tooth 5a is engaged by the teeth of the rotating power drive roll 12 so that the rotary motion is transmitted by journal 3 to the integral body 1 which rotates with the power drive roll 12, whereby cam follower 16 is driven by cam 2 to perform an angular movement on pivot shaft 19 for actuating the corresponding movable element of the typewriter.

Assuming that key lever 13 is still held in the depressed position when the coupling has performed substantially one revolution with the power drive roll 12, a stop projection 13a of the depressed key lever 13 is located in the path of movement of end portion 5b of coupling member 5, and the same is stopped so that coupling tooth 5a is disengaged from the power drive roll 12 whereupon body 1 with cam 2 also stops.

When key 14 is now released by the operator, key lever 13 returns to its higher position and stop projection 13a releases end portion 5b of coupling member 5. The friction between the continuously rotating drive shaft 11 and the inner surface of the central opening 1b of the integral body 1 is sufficient to turn the coupling further in counterclockwise direction until holding portion 15a again engages the end portion 5b of coupling member 5, holding portion 15a having returned to its lower holding position shown in FIG. 1 upon return of key lever 13 to its higher normal position.

In this position, portion 6b of locking member or pawl 6 is located adjacent holding portion 15a preventing a rearward turning of the coupling in clockwise direction. During the preceding turning of the coupling in counterclockwise direction for one revolution, portion 6b engages stop projection 13a before end portion 5b, but cannot block the turning movement since portion 6b is resiliently pressed to a position inwardly of the circular periphery of mounting disc 1a against the action of spring 7. Locking member 6, 6b determines the normal initial position of the coupling after each revolution.

If key 14 is quickly released by the operator before the coupling has completed one revolution, stop projection 13a is not located in the path of movement of end portion 5b, but holding portion 15a is again located in the path of movement of end portion 5b so that coupling member 5 is stopped by holding portion 15a and tooth 5a releases the teeth of the power drive roll 12, restoring the initial condition of the coupling.

During the single revolution of the coupling with cam 2 caused by the depression of the respective key lever 13, cam 2 effects an angular movement of cam follower 16 for actuating a movable element of which link 20 is a part.

It will be understood that each of the elements described above, or two or more together, may also find a useful application in other types of power rolling couplings for typewriters, differing from the types described above.

While the invention has been illustrated and described as embodied in a power roll coupling having an integral body including a cam and a mounting portion for coupling means and consisting of a synthetic plastic material, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the stand point of prior art fairly constitute essential characteristics of the generic or specific aspects of this invention, and, therefore, such adaptations should and are intended to be comprehended within the meaning and range of equivalence of the following claims.

What is claimed as new and desired to be secured by Letters Patent is:

1. In a typewriter or like business machine having a power drive roll with peripheral teeth and movable elements having cam follower portions, in combination, a coupling for connecting said power drive roll with one of said movable elements, including an integral body consisting of a synthetic plastic material and having a cam portion adapted to cooperate with one of said follower portions, and a mounting portion having a cutout therethrough; coupling means mounted on said mounting portion and cooperating with said teeth of said power drive roll so that the transmission of motion from said power drive roll to said movable element by said synthetic plastic material of integral body produces little noise, said coupling means including first and second members mounted on opposite sides of said mounting portion; and a spring means connecting said members and extending through said cutout from one side of said mounting portion to the other side of the same.

2. A coupling according to claim 1 wherein said mounting portion has integral projecting means forming journal means for supporting said coupling means for turning movement between a coupling position engaged by said teeth of said power drive roll and an inoperative position.

3. A coupling according to claim 2 wherein said mounting portion has a flat surface on which said coupling means slides, and at least one integral angular projection projecting parallel to said surface spaced from the same so as to form a gap for guiding said coupling means.

4. A coupling according to claim 1 wherein said mounting portion is a flat thin disc; and wherein said cam portion is located on one side of said disc and has a peripheral cam track at least partly inwardly spaced from the periphery of said disc.

5. In a typewriter or like business machine having a power drive roll with peripheral teeth and movable elements having cam follower portions, in combination, a coupling for connecting said power drive roll with one of said movable elements, including an integral body consisting of a synthetic plastic material and having a cam portion adapted to cooperate with one of said follower portions, and a mounting disc portion, said cam portion being located on one side of said mounting disc portion and having a peripheral cam track at least partly inwardly spaced from the peripheral of said mounting disc portion, said mounting disc portion having integral projections on opposite sides forming journals; and coupling means mounted on said mounting portion and cooperating with said teeth of said power drive roll so that a transmission of motion from said power drive roll to said movable element by said synthetic plastic material of said integral body produces little noise, said coupling means including first and second members mounted on said journals for turning movement.

6. A coupling according to claim 5 wherein said disc has a cutout; and comprising a spring connecting said members and passing through said cutout.

7. A coupling according to claim 6 and wherein said disc has on the other side thereof at least one angular projection projecting over the respective one of said members for guiding the same along the respective lateral surface of said disk.

8. A coupling according to claim 7 wherein said member which is mounted on said other side is a coupling member turnable on the respective journal for coupling said integral body with said power drive roll, and wherein said other member is a locking pawl.

References Cited

UNITED STATES PATENTS

| | | | |
|---|---|---|---|
| 1,945,895 | 2/1934 | Hart | 197—17 X |
| 2,059,537 | 11/1936 | Salzberger et al. | 197—17 |
| 2,119,928 | 6/1938 | Salzberger | 197—17 |
| 2,337,233 | 12/1943 | Dronighe et al. | 197—17 |
| 2,638,199 | 5/1953 | Schremp | 197—17 |
| 2,717,685 | 9/1955 | Buhler | 197—17 |
| 2,891,650 | 6/1959 | Ascoli | 197—17 |
| 2,902,131 | 9/1959 | Ascoli et al. | 197—17 |
| 3,077,255 | 2/1963 | Coleman et al. | 197—17 |
| 3,103,272 | 9/1963 | Roggenstein | 197—17 |
| 3,232,402 | 2/1966 | Koenen et al. | 197—17 |
| 3,215,247 | 11/1965 | Morris | 197—17 |

ROBERT E. PULFREY, *Primary Examiner.*

E. S. BURR, *Examiner.*